United States Patent Office 3,419,382
Patented Dec. 31, 1968

3,419,382
CONTROL OF CACTI
William Harry Culver, Bryan, Tex., assignor to Pennsalt Chemicals Corporation, Philadelphia, Pa., a corporation of Pennsylvania
No Drawing. Continuation-in-part of application Ser. No. 584,108, Oct. 4, 1966. This application Mar. 21, 1967, Ser. No. 624,717
6 Claims. (Cl. 71—128)

ABSTRACT OF THE DISCLOSURE

Chemical means for the control of undesirable cactus plants which comprises killing cacti by contacting them with hexafluoroarsenic acid or its salts.

---

This is a continuation-in-part of my application Ser No. 584,108, filed Oct. 4, 1966, now abandoned.

Cactus occurs on more than 35 million acres in Texas alone, according to a survey conducted by the United States Department of Agriculture, Soil Conservation Service, during 1963. The density of infestation as well as the number of acres infested has been increased for many years in spite of extensive, but ineffective, control measures used during the last 30 years. Cactus also occurs throughout parts of the Central Great Plains and in the desert rangelands of the Southwestern United States.

The two most widespread kinds of cacti in Texas are the prickly pear (*Opuntia lindheimeri* and *O. englemanni*) and tasajillo (*Opuntia leptocaulis*). They are both noted for their ability to reproduce by means of seed and also vegetatively. Each internode is a potential plant. The meristematic tissue surrounding each aureole is capable of differentiating and initiating root growth or aerial growth depending upon whether the aureole is upward or downward when the plant part falls on the soil. Another characteristic which makes control of these plant species difficult is the lack of a regular or continuous translocation of plant nutrients and water within the plant. Translocation occurs only sporadically and is dependent upon rainfall, temperature, and probably other factors. It is impossible to determine precisely when translocation is occurring or when it will occur.

Because of these peculiar plant characteristics, the only commercially acceptable chemical control measure has been the appliation of the herbicides 2,4,5–T or 2,4,5–TP (Silvex) in diesel fuel solutions or in diesel-water mixtures. The plants must be thoroughly covered with the herbicidal mixture, because pads (internodes) which are not contacted by the spray frequently survive even though the remainder of the plant is killed.

Many chemicals have been tried in an effort to control cactus species, but few, if any, have sufficient effect to warrant their commercial development. For example, Texas Agricultural Experiment Station Bulletin 721 (revised) indicates that well known herbicides such as ammonium sulfamate, pentachlorophenol, trichloroacetic acid, dinitro compounds, all fail to give satisfactory control of prickly pear. In some instances, compounds such as acid arsenic pentoxide solutions, which are effective, cannot be used because of their high toxicity to livestock and because of their highly corrosive nature to the equipment used. In accordance with this invention, however, it has now been found that hexafluoroarsenic acid and its salts are surprisingly effective for the control of cacti. In addition to being very inexpensive chemicals of commerce these compounds are useful at extremely low dosage levels and are neither repellent nor toxic to livestock, which may graze on the cactus infested lands. Furthermore, at levels necessary to control cacti, grasses and other desirable plants are not harmed.

In the practice of this invention, the cacti plants are contacted with the active agent, preferably by spraying onto the plants a formulation containing the active agent. Surprisingly, it is not necessary to cover the plants completely with the spray solution, nor is it necessary to make subsequent applications with water in order to insure leaching of the chemical into the soil. Leaching of the active agent to the roots of the cactus plant will occur when natural rainfall occurs, and the length of time between application of the active agent and rainfall is not critical. The appearance of fatal symptoms to the plant will be delayed until sufficient rainfall has occurred to leach the active compound into the root zone of the plant. The spray application may be made easily from airplanes, helicopters, or land vehicles equipped with spraying devices.

Formulations which may be used include dispersions in water or water solutions, with or without wetting agents which will aid in penetration of plant and soil surfaces. Instead of using aqueous systems, organic solvent systems may be employed with the active agent dispersed in the liquid carrier.

Formulations may also be prepared as concentrates containing from about 1% to about 90% by weight of active agent for dilution with water for field application. These concentrates may be prepared as aqueous solutions or as dispersions in organic solvent systems, as for example with xylene or other nonphytotoxic solvent, and suitable emulsifying agents may be added to obtain a dispersion of the active agent.

The salts which are useful in this invention will preferably be selected from acid and the alkali metal salts, the ammonium salts, primary, secondary and tertiary amine salts and quaternary ammonium salts of hexafluoroarsenic acid. That is, the preferred active agents will be those having the chemical formulation $MAsF_6$ where M is hydrogen, an alkali metal (such as sodium, potassium, lithium, and the like), an alkaline earth metal (e.g., barium, calcium, strontium, etc.), ammonium, substituted ammonium as derived from a primary secondary, tertiary or quaternary amine (e.g., methylamine, ethylamine, dimethylamine, triethylamine, octylamine, dioctylamine, dodecylamine, tridecylamine, dimethylbenzylammonium and the like). Particularly useful to form salts are the polyethoxylted amines obtained by reacting a long chain amine (e.g., cocoamine, tallow amine, soybean amine, oleyl amine, stearyl amine and the like with from about 2 to about 50 moles of ethylene oxide.

It will be understood, however, that the active chemical entity is the hexafluoroarsenic anion ($AsF_6^-$).

It is surprising that the hexafluoroarsenic anion is so effective in the control of cactus. Both hexafluoroarsenates and hexafluorophosphates are known to be herbicidal (U.S. Patent 3,189,428), but in long term evaluations it is found that only the hexafluoroarsenate gives effective cactus control. This again points up the unusual resistance of the cactus to chemical control and indicates a high degree of specificity of the plant in its response to chemical agents.

Examples of suitable formulations which may be used in accord with this invention are as follows.

(I) Aqueous solutions:

|  | A | B | C |
|---|---|---|---|
| $KAsF_6$, percent | 10 | 20 | 40 |
| Water, percent | 90 | 80 | 60 |

(II) Organic solvent concentrate:

| | Percent |
|---|---|
| (A) Dibutylammonium hexafluoroarsenate | 10 |
| Acetone | 90 |
| (B) HAsF$_6$ | 10 |
| Dimethyltridecylamine | 12 |
| Diacetone alcohol | 73 |
| Surfactant ("Triton" X-161) | 5 |

(III) Aqueous concentrate (suspension):

| | Percent |
|---|---|
| HAsF$_6$ | 10 |
| CaCO$_3$ | 5 |
| Water | 85 |

The rate of application will vary somewhat depending upon the particular stand of cacti being treated, weather conditions, and the like. However, it will generally be possible to effectively control cacti with one to five pounds of active agent per acre being treated. As already indicated conventional ground or aerial methods of application will be used.

In order to further illustrate the invention the following examples are given:

EXAMPLE 1

Two pounds of potassium hexafluoroarsenate dissolved in six gallons of water (1.67 pounds acid equivalent) per acre were applied by means of spray equipment to rangeland infested with a dense stand of prickly pear. Application was made in June and observation of the treated area in September of the following year revealed that the prickly pear plants had collapsed and almost all of the pads which had been present at the time of spraying were dead. Some daughter pads had formed, but all of them were exhibiting symptoms of the toxic effect of the hexafluoroarsenate. All the plants in the treated area had died shortly thereafter and no prickly pear remained. Prickly pear in the adjacent area remained normal and healthy except for a few plants within a few feet of the treated zone which showed toxic symptoms.

EXAMPLE 2

4.16 pounds of hexafluoroarsenic acid in the form of the potassium salt were dissolved in 100 gallons of water and applied to two and one-half acres of rangeland which was badly infested with prickly pear. Some tasajillo, pitalla, and other plants of cactus species were also present. Application was made in June and examination of the area the following March showed that most of the cactus plants in the area were completely dead. All of the plants that had roots were exhibiting toxic symptoms. Many pads had not rooted. This is a very unusual phenomenon and is highly significant. The roots on the surviving pads were brownish and they were not branched normally, indicating severe effect on the chemical. Other cactus species exhibited the same symptoms and lethal effects.

EXAMPLE 3

Two formulations were prepared as follows.

Formulation A: By wt. percent
Polyethoxylated amine [1] salt of HAsF$_6$ _____ 10
Xylene _____ 90
Formulation B:
Polyethoxylated amine [1] salt of HPF$_6$ _____ 10
Xylene _____ 90

[1] The polyethoxylated amine used was ethoxylated tallow amine which is characterized by the structure

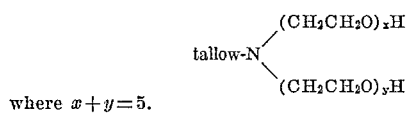

where $x+y=5$.

Each of the above formulations were diluted with water to make a spray composition which was applied to pricky pear plants having 2 or more pads and growing in one square foot flat of soil. The following table indicates the results of the test at the various rates of application used:

TABLE I

| Rate per acre applied | Percent of prickly pear pads killed | |
|---|---|---|
| | Formulation A | Formulation B |
| 1 | 10 | <10 |
| 2 | 25 | 0 |
| 4 | 50 | <10 |

The above data indicates the surprising effectiveness of the hexafluoroarsenate anion in view of the relative inactivity of the hexafluorophosphate anion. Furthermore, this remarkable difference in effect is also observed in field trials on large plots of prickly pear where they are treated with alkali metal salts of HAsF$_6$ and HPF$_6$. Although the HPF$_6$ salts do show some initial activity, their toxic effect is not maintained, whereas the HAsF$_6$ salts continue to control growth of the prickly pear over long periods of time, resulting in death eventually.

EXAMPLE 4

The ammonium salt of hexafluoroarsenic acid and the potassium salt of hexafluorophosphoric acid was formulated in an aqueous spray composition without surfactant and used to contact prickly pear growing in various types of soil. The following Table II indicates the conditions of test and the responses obtained. The rates of control shown in the table are a subjective evaluation three and one-half months after treatment and are based on the following scale:

0—no discernible effect,
1—slight discoloration of a few pads,
2—major discoloration or effect on a few pads,
3—severe discoloration on many pads,
4—severe damage to many pads,
5—plants collapsing or pads falling from plants.

Except as noted, the active agent was applied with ground spray equipment delivering 15 gallons per acre when covering a 50 foot swath and was used on double 25-foot swaths to obtain coverage of 30 gallons per acre on flats 165 feet x 500 feet.

TABLE II

| Anion of active agent | Rate (lbs./acre) | Rate of control | | | |
|---|---|---|---|---|---|
| | | Soil 1 | Soil 2 | Soil 3 | Average |
| AsF$_6^-$ | 1 | 2.3 | 1.3 | 1.3 | 1.6 |
| AsF$_6^-$ | 2 | 3.7 | 3.3 | 2.3 | 3.1 |
| AsF$_6^-$ | [1] 2 | 3.3 | 3.2 | 2.3 | 2.9 |
| AsF$_6^-$ | 4 | 4.7 | 3.7 | 3.3 | 3.9 |
| PF$_6^-$ | 2 | 1.0 | 0.3 | 0.3 | 0.5 |
| PF$_6^-$ | 4 | 2.0 | 1.0 | 0.7 | 1.2 |

[1] Aerial spray by fixed wing plane at 5 gallons per acre.
NOTE.—Soil 1: Delmita fine sandy loam; Soil 2: Heavy saline clay loam; Soil 3: Maverick clay.

The data obtained suggests some variation between different types of soil, but no variation between ground and aerial spray techniques. It is of interest to note that the unexpected differences in activity between AsF$_6^-$ and PF$_6^-$ is clearly shown in the table, the AsF$_6^-$ being significantly more active than PF$_6^-$.

In no case in the above evaluations was any injury to or suppression of desirable forage species observed.

I claim:

1. A process for killing cactus plants growing in cattle rangeland forage areas without injury to desirable forage species which comprises spraying a cactus infested area with from 1 to 5 pounds per acre of the hexafluoroarsenate anion.

2. The process of claim 1 wherein the active agent is hexafluoroarsenic acid.

3. The process of claim 1 wherein the active agent is an alkali metal salt of hexafluoroarsenic acid.

4. The process of claim 1 wherein the active agent is potassium hexafluoroarsenate.

5. The process of claim 1 wherein the active agent is an amine salt of hexafluoroarsenic acid.

6. The process of claim 1 wherein the active agent is a polyethoxylated amine salt of hexafluoroarsenic acid.

References Cited

UNITED STATES PATENTS 3,189,428   6/1965   Mussell _____ 71—2.2

JAMES O. THOMAS, JR., *Primary Examiner.*

U.S. Cl. X.R.

71—97